(12) United States Patent
Hoffmann et al.

(10) Patent No.: US 10,139,844 B1
(45) Date of Patent: Nov. 27, 2018

(54) METHOD TO SUPPRESS CASCADING FAILURES IN A TRANSMISSION NETWORK

(71) Applicant: HRL Laboratories, LLC, Malibu, CA (US)

(72) Inventors: Heiko Hoffmann, Simi Valley, CA (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 288 days.

(21) Appl. No.: 14/747,217

(22) Filed: Jun. 23, 2015

Related U.S. Application Data

(60) Provisional application No. 62/016,443, filed on Jun. 24, 2014.

(51) Int. Cl.
G05D 3/12 (2006.01)
G05D 5/00 (2006.01)
G05D 9/00 (2006.01)
G05D 11/00 (2006.01)
G05D 17/00 (2006.01)
G05F 1/66 (2006.01)
G01R 31/02 (2006.01)
G05B 15/02 (2006.01)
G06F 17/16 (2006.01)

(52) U.S. Cl.
CPC .............. *G05F 1/66* (2013.01); *G01R 31/024* (2013.01); *G05B 15/02* (2013.01); *G06F 17/16* (2013.01)

(58) Field of Classification Search
CPC ........... G05F 1/66; G05B 15/02; G06F 17/16; G01R 31/024; H04Q 3/00

USPC .......... 700/292; 361/71; 370/410; 703/2, 18, 703/21; 702/57, 58
See application file for complete search history.

(56) References Cited

U.S. PATENT DOCUMENTS

| 8,589,198 B2 | 11/2013 | McMullen | |
| 2007/0067065 A1* | 3/2007 | El-Gasseir | G06Q 10/00 700/286 |
| 2011/0282508 A1* | 11/2011 | Goutard | H04L 63/20 700/293 |
| 2011/0313581 A1* | 12/2011 | Genc | G05B 23/0248 700/292 |
| 2012/0123602 A1* | 5/2012 | Sun | H02J 3/14 700/292 |

(Continued)

OTHER PUBLICATIONS

P.-A. Noel, C. D. Brummitt and R. M. D'Souza, Physical Review Letters 111, 078701 (2013), pp. 078701-1-078701-5. , Aug. 16, 2013.

(Continued)

*Primary Examiner* — Mohammad Ali
*Assistant Examiner* — Md Azad
(74) *Attorney, Agent, or Firm* — Tope-McKay & Associates

(57) ABSTRACT

Described is a system for reducing the probability of large-scale failures in a transmission network. Tripped or damaged transmission lines in a transmission network are identified following a cascading failure. After each cascading failure, a subset of transmission lines is updated according to a specified rule to alter long-term dynamics of the transmission network such that the transmission network does not converge into a critical state.

16 Claims, 16 Drawing Sheets

(56) References Cited

U.S. PATENT DOCUMENTS

2014/0180663 A1* 6/2014 Acharya ............... H02J 13/001
　　　　　　　　　　　　　　　　　　　　　　　　　　　703/18

OTHER PUBLICATIONS

T. A. Davis, "Algorithm 832: UMFPACK V4.3—an Unsymmetric-Pattern Multifrontal Method," ACM Trans. Math. Softw. 30, pp. 196-199, 2004.
B. A. Carreras, V. E. Lynch, I. Dobson, and D. E. Newman, in Hawaii International Conference on System Sciences (IEEE, 2002), 0-7695-1435-9/02.
H. J. Jensen, Self-Organized Criticality: Emergent Complex Behavior in Physical and Biological Systems, Cambridge Lecture Notes in Physics (Cambridge University Press, 1998), Section 2.1, p. 7-8, and Section 4.2.2, pp. 34-35.
P. L. Anderson and I. K. Geckil, Anderson Economic Group Working Paper 2 (2003), pp. 1-8.
P.-A. Noel, C. D. Brummitt, and R. M. D'Souza, Physical Review Letters 111, 078701 (2013), pp. 078701-1-078701-5.
R. D. Zimmerman, C. E. Murillo-Sánchez, and R. J. Thomas, "MATPOWER: Steady-State Operations, Planning and Analysis Tools for Power Systems Research and Education," Power Systems, IEEE Transactions on, vol. 26, No. 1, pp. 12-19, (2011).
S.-J. S. Tsai, L Zhang, A. G. Phadke, Y. Liu, M. R. Ingram, S. C. Bell, I. S. Grant, D. T. Bradshaw, D. Lubkeman, L. Tang, Study of global frequency dynamic behavior of large power systems, in: Power Systems Conference and Exposition, vol. 1, IEEE, pp. 328-335, (2004).

* cited by examiner

METHOD TO SUPPRESS CASCADING FAILURES IN A TRANSMISSION NETWORK

CROSS-REFERENCE TO RELATED APPLICATIONS

This is a Non-Provisional Application of U.S. Provisional Patent Application No. 62/016,443, filed Jun. 24, 2014, entitled, "Method to Suppress Cascading Failures in a Transmission Network", the entirety of which is incorporated herein by reference.

BACKGROUND OF INVENTION

(1) Field of Invention

The present invention relates to a system for reducing the probability of large-scale failures in a transmission network and, more particularly, to a system for reducing the probability of large-scale failures in a transmission network by altering the long-term dynamics of the transmission network such that the transmission network is sub-critical.

(2) Description of Related Art

A cascading failure is a failure in a system of interconnected parts, such as a power transmission network, in which the failure of a part can trigger the failure of successive parts. Cascading failure is common in power grids when one of the elements fails (completely or partially) and shifts its load to nearby elements in the system. Those nearby elements are then pushed beyond their capacity so they become overloaded and shift their load onto other elements.

One of the primary problems with preventing electrical grid failures is that the speed of the control signal is no faster than the speed of the propagating power overload. For the power-grid, the cost of an outage depends non-linearly on its size: smaller outages can be compensated by backup systems, while large events lead to lost revenue, spoiled goods, and other cost in addition to repairs. For instance, the 2003 Northeast Blackout was estimated to reduce U.S. earning by $6.4 Billion (see the List of Incorporated Literature References, Literature Reference No. 1).

Mathematical models have been devised to understand a variety of natural phenomena such as cascading failures, earthquakes, and forest fires. A key observation is that many of these models exhibit a property known as self-organized criticality (SOC). In SOC models, there is a tendency for a slow buildup of energy followed by a sudden release of energy. These sudden release events are referred to as avalanches. In the case of the power grid, an avalanche is a sequence of events leading to consecutive power-line failures. The unique property of SOC systems is that the probability of any given size avalanche follows a power law distribution. When natural systems exhibit this behavior, it can mean that extremely large-scale catastrophic events can occur more often than desired.

Some previous attempts to alter the power-law behavior in SOC models have been explored. Literature Reference No. 2, for example, describes a control scheme for regulating avalanches in a sandpile model. The authors devised a rule of adding sand (interpreted as load) such that the distribution of avalanches can be regulated to either critical (i.e., power-law distributed) or sub-critical; however, an abstract model is used and there is no suggestion of strategies for a real network, such as the power grid.

McMullen devised a method for operating a power grid in U.S. Pat. No. 8,589,198 entitled, "Methods and systems involving power system grid management." The method keeps track of damaged asset data and generates a plan to restore the power grid. The invention described by McMullen does not alter the power grid in a way that the distribution of cascading failures changes from critical to sub-critical.

Thus, a continuing need exists for a system to reduce the probability of large-scale failures in transmission networks that alters the long-term dynamics of the network in such a way that the network is sub-critical.

SUMMARY OF THE INVENTION

The present invention relates to a system for reducing the probability of large-scale failures in a transmission network and, more particularly, to a system for reducing the probability of large-scale failures in a transmission network by altering the long-term dynamics of the transmission network such that the transmission network is sub-critical. The system comprises one or more processors and a memory having instructions such that when the instructions are executed, the one or more processors perform multiple operations. The system receives input data regarding tripped or damaged transmission lines in a transmission network following a cascading failure. A subset of transmission lines to be modified is identified. A capacity threshold value is specified for each transmission line in the subset of transmission lines to alter long-term dynamics of the transmission network such that the transmission network does not converge into a critical state.

In another aspect, the subset of transmission lines comprises all tripped or damaged transmission lines plus a random set of at least one unbroken transmission line.

In another aspect, the subset of transmission lines is updated to their original capacity threshold values.

In another aspect, the subset of transmission lines is updated with a capacity threshold value that is higher than their original capacity threshold values.

In another aspect, a cascading failure in the transmission network is simulated. A cost of the cascading failure is estimated, wherein the estimated cost is utilized to determine an average number of unbroken transmission lines in the random set of at least one unbroken transmission line to update.

In another aspect, the subset of transmission lines comprises all tripped or damaged lines, and the capacity threshold value is based on a random function of its original capacity threshold value.

In another aspect, the random function defines the updated capacity threshold value to be randomly drawn from a uniform distribution centered at a target threshold capacity value.

In another aspect, the target threshold capacity value is equivalent to an original threshold capacity value.

In another aspect, the target threshold capacity value is increased proportional to an average increase in demand over a time period.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
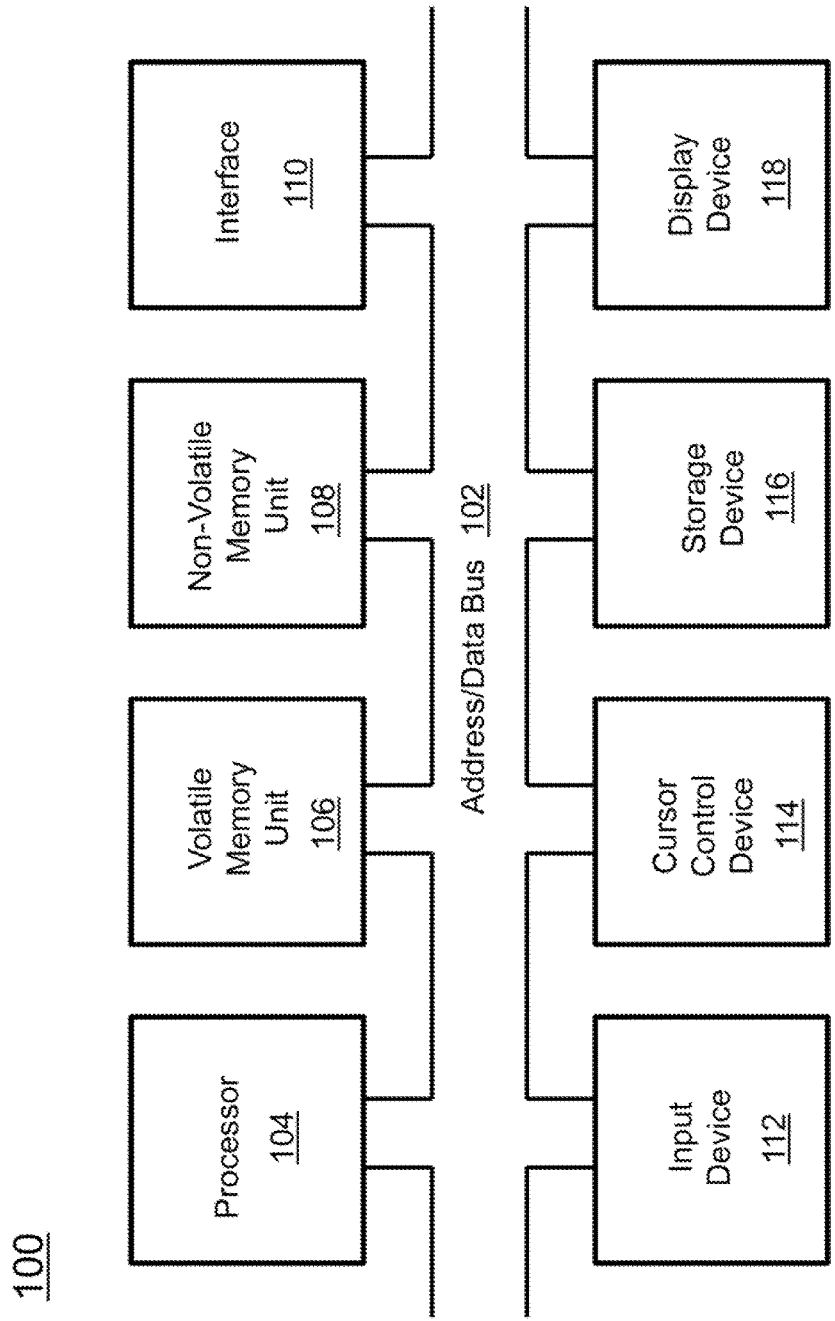
FIG. 1 is a block diagram depicting the components of a system for reducing the probability of large-scale failures in transmission networks according to the principles of the present invention.

The present invention relates to a system for reducing the probability of large-scale failures in a transmission network and, more particularly, to a system for reducing the probability of large-scale failures in a transmission network by altering the long-term dynamics of the transmission network such that the transmission network is sub-critical. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. P. L. Anderson and I. K. Geckil, Anderson Economic Group Working Paper 2 (2003).

2. P.-A. Noel, C. D. Brummitt, and R. M. D'Souza, Physical Review Letters 111, 078701, "Controlling Self-Organizing Dynamics on Networks Using Models that Self-Organize," (2013).
3. T. A. Davis, "Algorithm 832: UMFPACK V4.3—an Unsymmetric-Pattern Multifrontal Method," ACM Trans. Math. Softw. 30, pp. 196-199, 2004.
4. B. A. Carreras, V. E. Lynch, I. Dobson, and D. E. Newman, in Hawaii International Conference on System Sciences (IEEE, 2002).
5. H. J. Jensen, Self-Organized Criticality: Emergent Complex Behavior in Physical and Biological Systems, Cambridge Lecture Notes in Physics (Cambridge University Press, 1998).

(2) PRINCIPAL ASPECTS

The present invention has three "principal" aspects. The first is a system for reducing the probability of large-scale failures in transmission networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
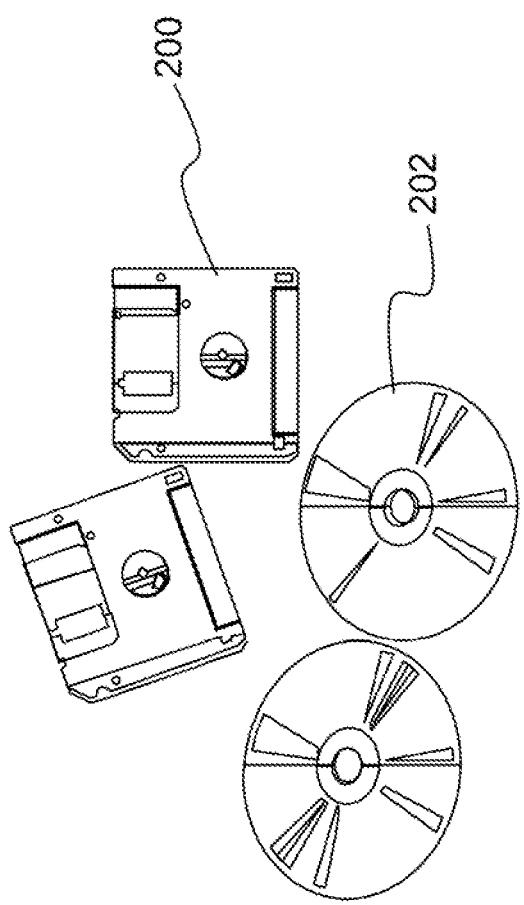
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION

Figure 3A:
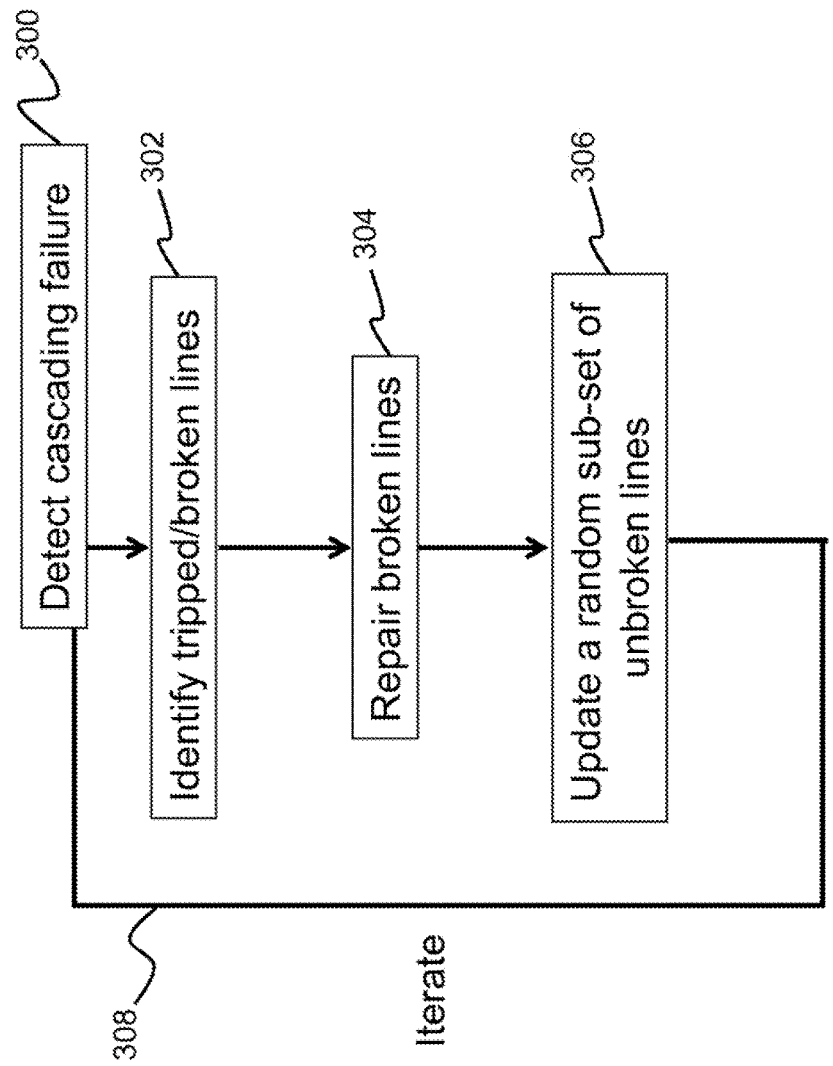
FIG. 3A is a flow diagram of a first embodiment of the system according to the principles of the present invention.
Figure 3B:
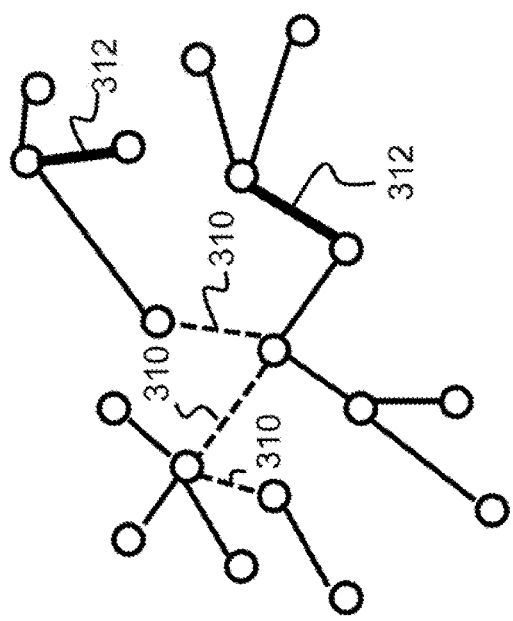
FIG. 3B is an illustration of a network of transmission lines depicting the first embodiment of the system according to the principles of the present invention.

Described is a system that greatly reduces the probability of large-scale failures in transmission networks. The system according to the principles of the present invention comprises a maintenance scheme that alters the long-term dynamics of the network in such a way that the network is sub-critical (i.e., the size of failures follows a distribution that decays faster than a power law). Thus, large failures become much less likely. The underlying principal is that the long-term dynamics are altered in a way that the system does not converge into a critical state. To achieve these dynamics, the present invention has two embodiments. FIGS. 3A and 3B depict the first embodiment.

It is assumed that a tripping threshold (or capacity threshold) of a transmission line gradually decreases over time, or equivalently that the load (or demand) in the network gradually increases. Following detection of a cascading failure 300, a device identifies tripped or damaged transmission lines 302. Subsequently, these lines are reset or repaired 304. If the tripping threshold decreases over time, these lines are reset or repaired to their original threshold, which is the default threshold. If the demand gradually increases, the default threshold to which lines are reset is increased in the same proportion as the increase in demand. In addition to these repairs, a multitude of unbroken lines is randomly selected (i.e., random subset of unbroken lines), and they too are reset or repaired such that their tripping threshold is restored to the default value (i.e., update a random subset of unbroken lines 306). The default value is specified by the manufacturer of the power line. To do so, a device generates a multitude of random numbers and associates a line with each random number. The process is repeated/iterated 308 after each cascading failure 300 as long as the power grid exists.

Identification of tripped or damaged transmission lines 302 depends a lot on the specifics of the utility station. It is presumed that a utility station has the means (e.g., a computer system and sensors connected with the transmission lines that relay information to the computer system) to monitor their lines or at least, sets of lines. If the utility station cannot monitor individual lines, there may also have to be a manual process of physically going to the site of a damaged line and assessing the part that is damaged. For the purposes of the present invention, a report of which lines are damaged is received as data input.

Regarding reset/repair of transmission (e.g., power) lines, two types of fault can be considered. One is that the line itself becomes damaged or broken and another is that a circuit breaker trips and cuts off power to the line. In the first type, there must be a manual repair to the line. At the time of repair, the line itself could simply be patched, or an entirely new line would be strung depending on the type and extent of the damage. In the second type, the breaker must be reset. This depends on the type of breaker. In some cases, the reset may also have to be manual. In others, there may be an electronic means to reset the breaker. If there is an electronic means to reset a breaker, then that could be accomplished by a computer system.

FIG. 3B depicts a network of transmission lines representing the first embodiment of the present invention. The dashed lines 310 represent the tripped/broken lines. The bold lines 312 represent the randomly chosen unbroken lines.

Figure 4A:
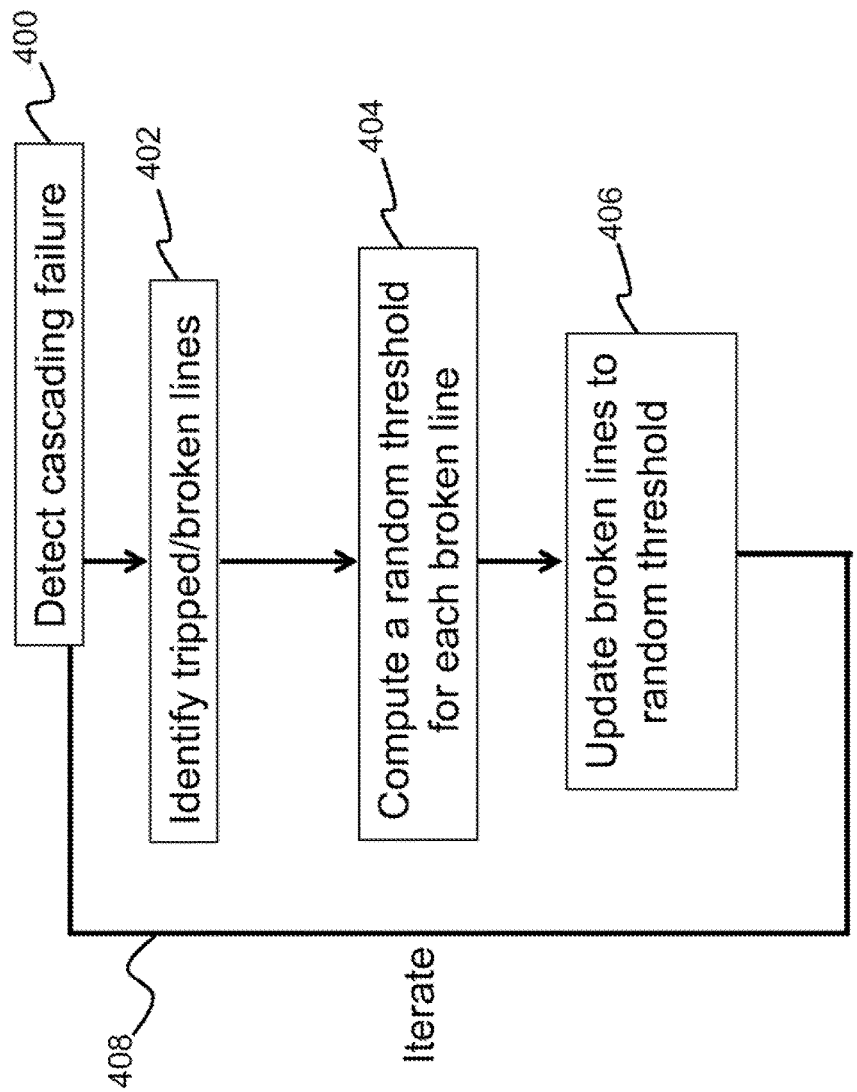
FIG. 4A is a flow diagram of a second embodiment of the system according to the principles of the present invention.
Figure 4B:
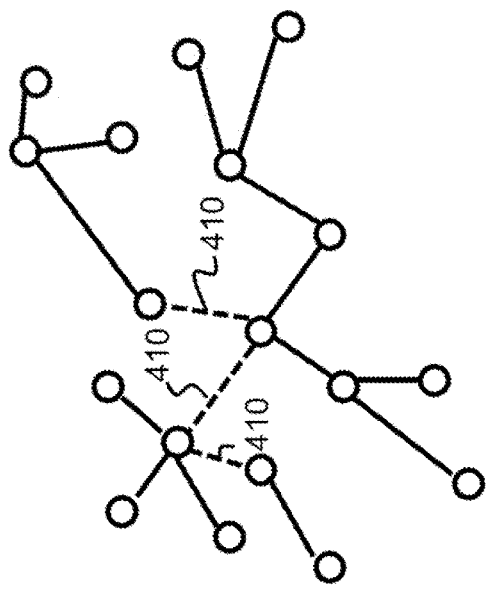
FIG. 4B is an illustration of a network of transmission lines depicting the second embodiment of the system according to the principles of the present invention.

In a second embodiment of the present invention depicted in FIGS. 4A and 4B, additional repairs of unbroken lines are not carried out. As in the first embodiment, a cascading failure is detected 400 and tripped or broken lines are identified 402. A device generates a random threshold/value computed for each tripped/broken line 404. After a cascading failure 400, the tripped or broken lines are reset to a random threshold (i.e., update broken lines to random threshold 406), distributed in an interval around the default threshold value. A non-limiting example of a random threshold is a random number uniformly chosen from the interval $[T-\mu/2; T+\mu/2]$, where T is the default value and $\mu$ is the width of the interval. The process is repeated/iterated 408 after each cascading failure 400.

FIG. 4B depicts a network of transmission lines representing the second embodiment of the present invention. The dashed lines 410 represent the tripped/broken lines.

An update (or upgrade) to transmission lines, such as updating the capacity threshold value, is accomplished at the time of repair/reset. In a manual case, the upgrade might involve replacing the line with a newly strung line of higher capacity. In the case of a breaker, there would be a means to control the trip-threshold of the breaker (preferably by software) such that the breaker would trip at a higher current. A breaker trip threshold can only be increased so much before a new line must be put in as well, so some upgrades may require both.

Repair of damaged lines with an update to a random threshold value would mean that the manual replacement of lines might, in some cases, involve replacing a broken line with a lower capacity than it had originally, or replacing the line with the same quality and merely setting its breaker to a lower threshold. If the damage in such cases is due to a breaker trip and not a broken line, then all that is needed is to reset the breaker and change its threshold to a random value.

Figure 5:
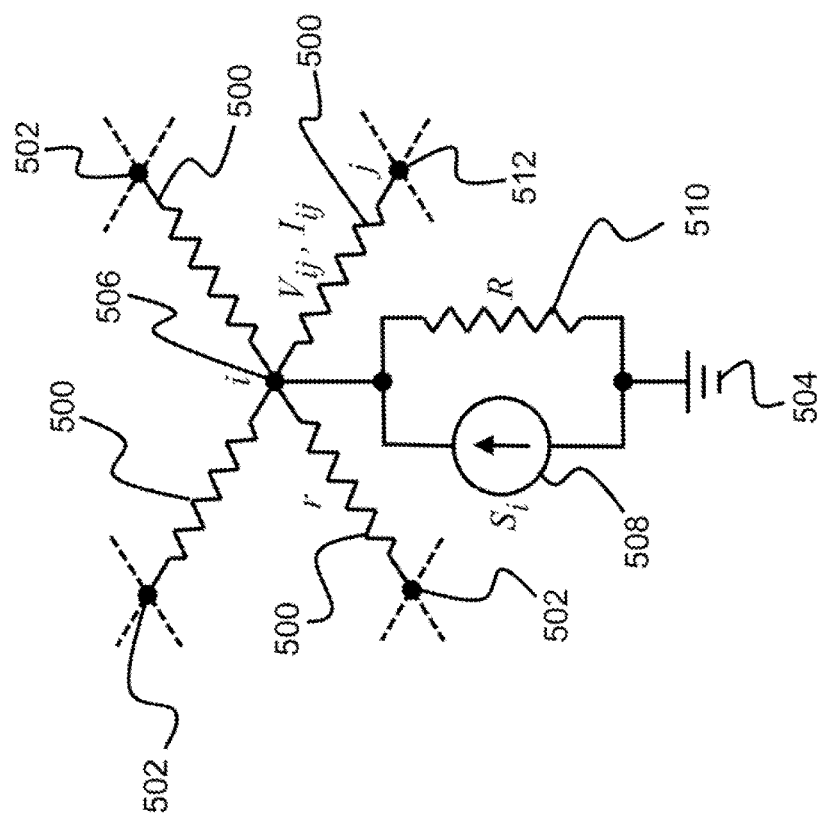
FIG. 5 is an illustration of a power-grid circuit model according to the principles of the present invention.

The proper function of the system according to the principles of the present invention was tested in a non-limiting example simulation of a direct current (DC) circuit. Additionally, the system according to the principles of the present invention could be applied to AC power grids. As shown in FIG. 5, the simplified power grid consists of a network of power lines 500 connecting nodes 502 on a graph, DC current generators (i.e., a current source $S_i$ 508) at each node, and loads (i.e., local load resistor R 510) connecting each node to ground 504, as shown in FIG. 5. Each node i 506 is connected to a current source $S_i$ 508 and a load resistor R 510. The grid power lines 500 have a resistance of r. The current generators vary in strength, with values randomly distributed in the interval [0; $I_0$] to mimic a distribution of residential solar cells and larger power stations.

For the grid network, an arbitrary graph of n nodes is assumed. The graph is defined given a connectivity matrix $M_{ij}$, where $M_{ij}=1$ if node i 506 is connected to node j 512, and $M_{ij}=0$ otherwise. If a line trips, the corresponding element in M is set to zero. For each node i 506, the source current $S_i$ 508 gets distributed to the local load resistor R 510 and to the neighboring nodes 502 connected through power lines 500 of resistance r.

Thus, according to Kirchhoff's laws, $$S_i - \frac{V_i}{R} - \sum_{j \in N_i} \frac{V_i - V_j}{r} = 0, \quad (1)$$

where $V_i$ is the voltage and N the set of neighbors of node i 506. Given the connectivity matrix M of the graph, one can write the above equations as follows:

$$\left(\frac{1}{R} + \frac{k_i}{r}\right) V_i - \sum_j \frac{M_{ij}}{r} V_j = S_i, \quad (2)$$

where $k_i$ is the degree of node i 506, $k_i = \sum_j M_{ij}$. This set of linear equations can be solved for the voltage distribution $V_i$. To solve the equations, a sparse linear solver was used (see Literature Reference No. 4 for a description of a sparse linear solver). The solution to equation (4) below depends on the ratio of r/R, which was set to 0.001, a non-limiting example of a resistance in the transmission lines that is low compared to the load at each node. Given $V_i$, the current for each transmission line 500 was evaluated according to the following:

$$I_{ij} = \frac{|V_i - V_j|}{r}, \quad (3)$$

and the maximum normalized current above threshold $T_{ij}$ was computed according to the following:

$$\Delta I_{max} = \max_{ij}\left(\frac{I_{ij} - T_{ij}}{T_{ij}}\right). \quad (4)$$

If $\Delta I_{max} \geq 0$, the corresponding line trips, and the voltage distribution $V_i$ is recomputed. After each line failure, the line was removed and the voltages were recomputed since their redistribution happens at the speed of light and is, therefore, likely faster than the process of line failure. The consecutive failure of lines until $\Delta I_{max} < 0$ is called an avalanche.

To put stress on the network according to the principles of the present invention and bring lines to their limit, all $T_{ij}$ were let to decay exponentially, and after an avalanche, the lines in the avalanche were repaired ($M_{ij}=1$) and their threshold was reset to $T_{ij}^0$, which is the original threshold value for each line. A related mechanism, a cycle of gradual increase in demand and line upgrade, has been suggested for a different kind of power distribution model (see Literature Reference No. 4 for a description of the power distribution model).

In a simulation of the system according to the principles of the present invention, an outer and inner iteration loop are used for both embodiments. The outer loop iterates over avalanches, and the inner loop computes the cascade of an avalanche, iteratively solving equation (2) and removing lines until all currents are below threshold. To simulate a continuous decay of thresholds, in each iteration step t of the outer loop, set $T_{ij}^{t+1} = \lambda T_{ij}^t$ for all lines and choose the decay constant $\lambda$ such that one line is at the threshold and all others below. Using a continuous decay is important; otherwise, a discrete time step (i.e., a fixed $\lambda$ value) would introduce a characteristic length and, thus, break the power-law distribution for sufficiently large graphs. This adaptation of $T_{ij}$ further makes the absolute values of r and $I_0$ irrelevant. Since $\lambda$ is variable, the duration varies between avalanches. To capture this variance, $\Delta t = \ln(\lambda)$ is recorded and its mean value computed.

Figure 6:
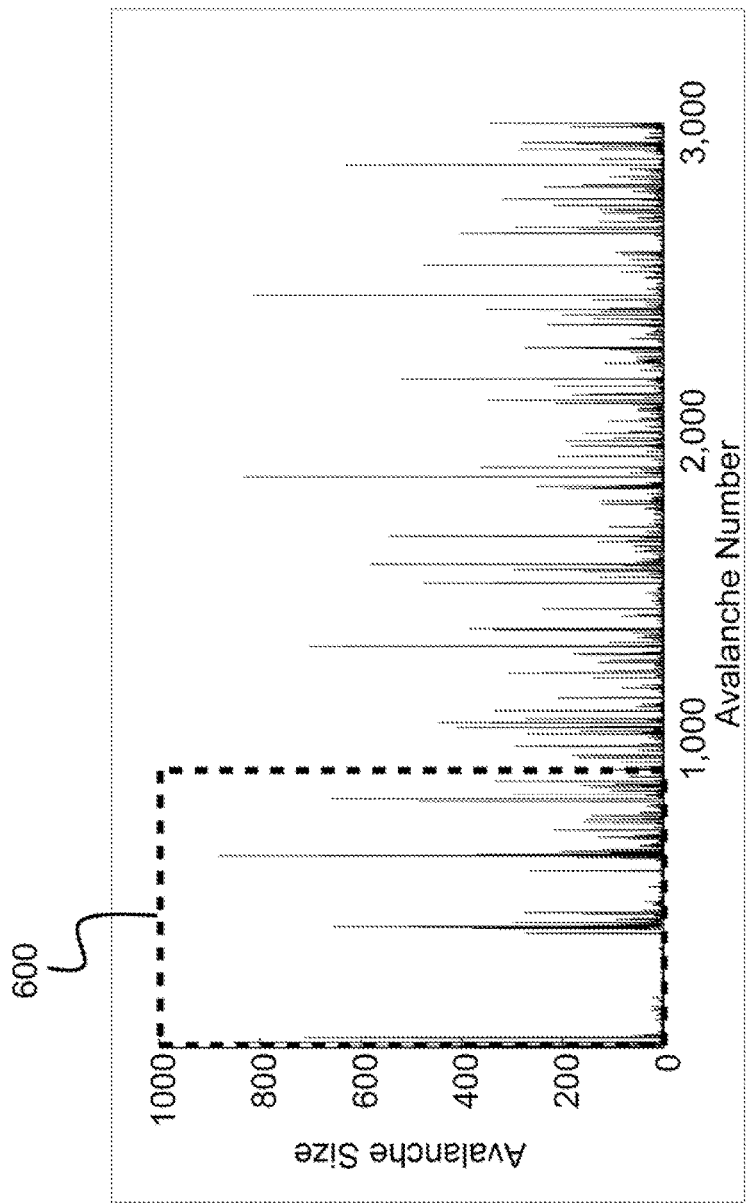
FIG. 6 is an illustration of raw data of avalanche sizes for a square lattice according to the principles of the present invention.

Experiments were performed with two different types of grid graphs: square and triangular lattices with L*L nodes and periodic boundary conditions (i.e., toroidal graphs). Periodic boundary conditions were chosen because it was desired that all nodes be geometrically indistinguishable to reduce limit-size effects. A single run consisted of 500,000 iteration steps for the outer loop (i.e., 500,000 avalanches). The size of an avalanche was defined as the total number of tripped lines during a cascade. From iteration to iteration, this size fluctuated, and this fluctuation took several iterations to settle into a typical pattern. FIG. 6 shows the raw data of avalanche sizes for the L=50 square lattice. The dashed rectangle 600 marks the settling phase, during which the system approaches the self-organized critical state. Such settling is typical for self-organized critical (SOC) systems (described in Literature Reference No. 5), where a system requires some time to self-organize into a critical state.

Since a focus of the invention described herein is analyzing the SOC behavior, the first 2,000 avalanches of a simulation run were removed, and the analysis was restricted to the remaining avalanches. This number was sufficient for the largest graph, a square lattice with L=50, and smaller graphs approached the critical state faster. In the following, evidence for SOC behavior is demonstrated, and mitigation strategies to suppress power-law distributed avalanches are described.

(3.1) Evidence for Self-Organized Criticality

Figure 7A:
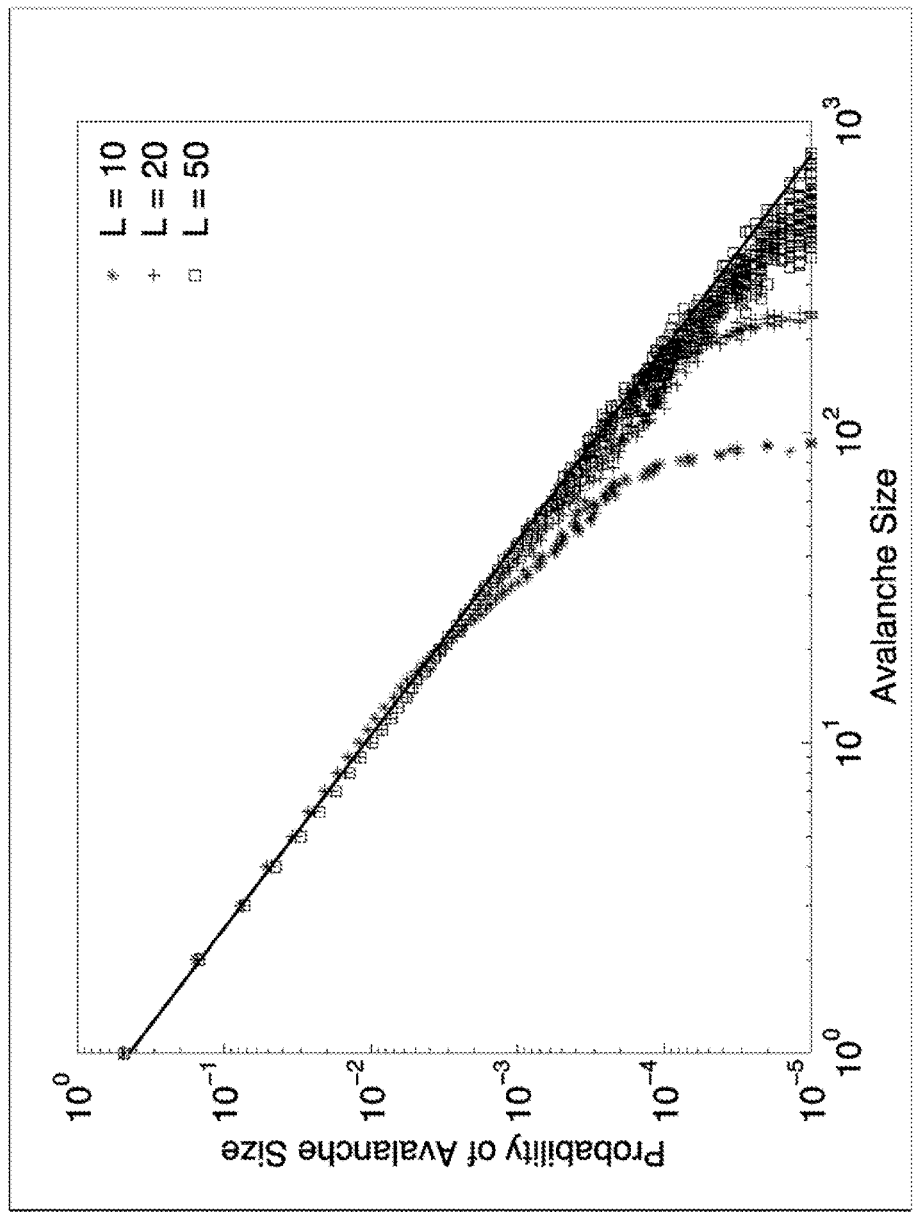
FIG. 7A is an illustration of scale-free behavior of avalanches in the power-grid model on a square lattice according to the principles of the present invention.
Figure 7B:
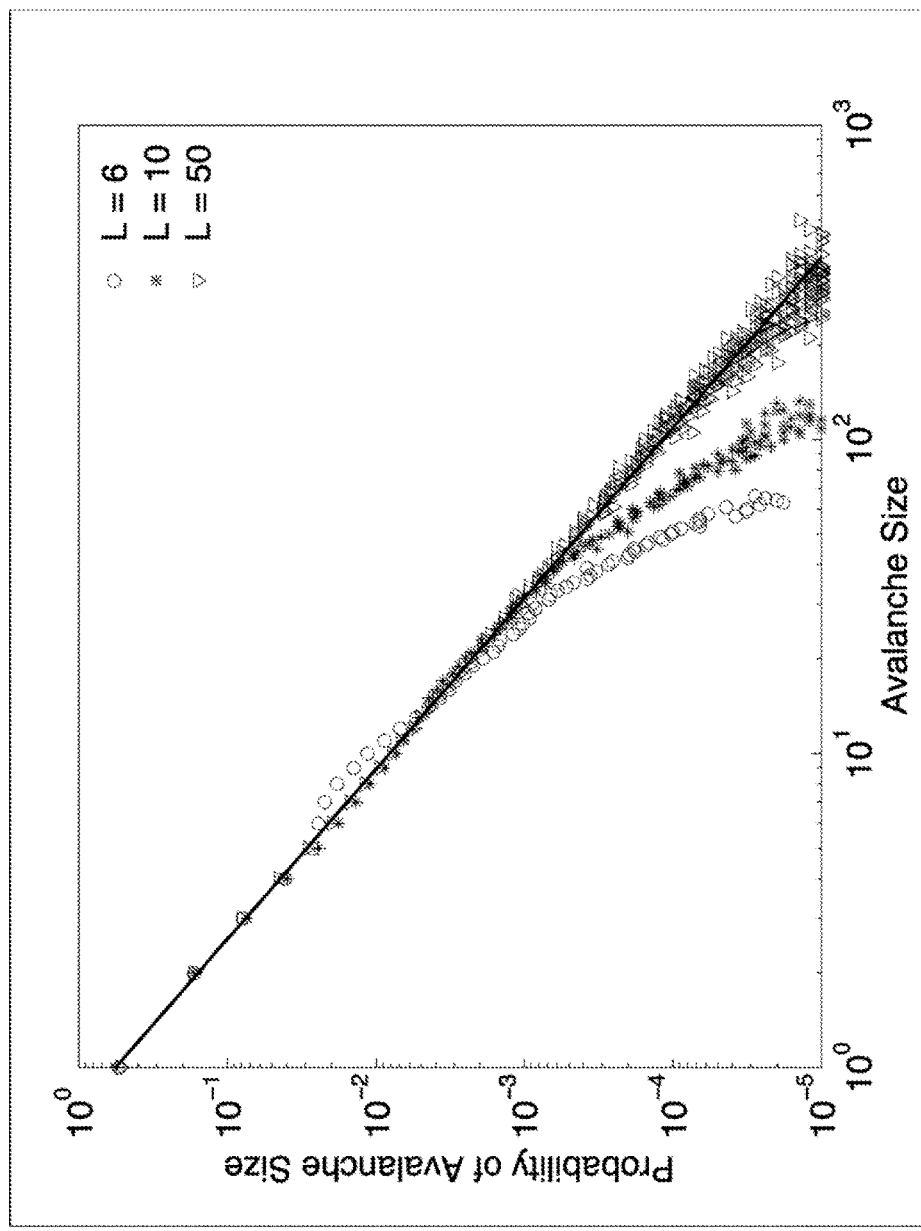
FIG. 7B is an illustration of scale-free behavior of avalanches in the power-grid model on a triangular lattice according to the principles of the present invention.

On the square and triangular lattices, the probability of avalanche sizes followed a power law, and the cut-off from the power law increased with system size, as shown in FIGS. 7A and 7B. These characteristics indicate criticality (see Literature Reference No. 5), and, as shown in FIG. 6, the system self-organized itself into this critical state. FIGS. 7A and 7B show the scale-free behavior of avalanches in the power-grid model according to the principles of the present invention on the square (FIG. 7A) and triangular (FIG. 7B) lattices. A power law was fitted to the data for L=50.

(3.2) Mitigation Strategies to Suppress Power-Laws

Figure 8A:
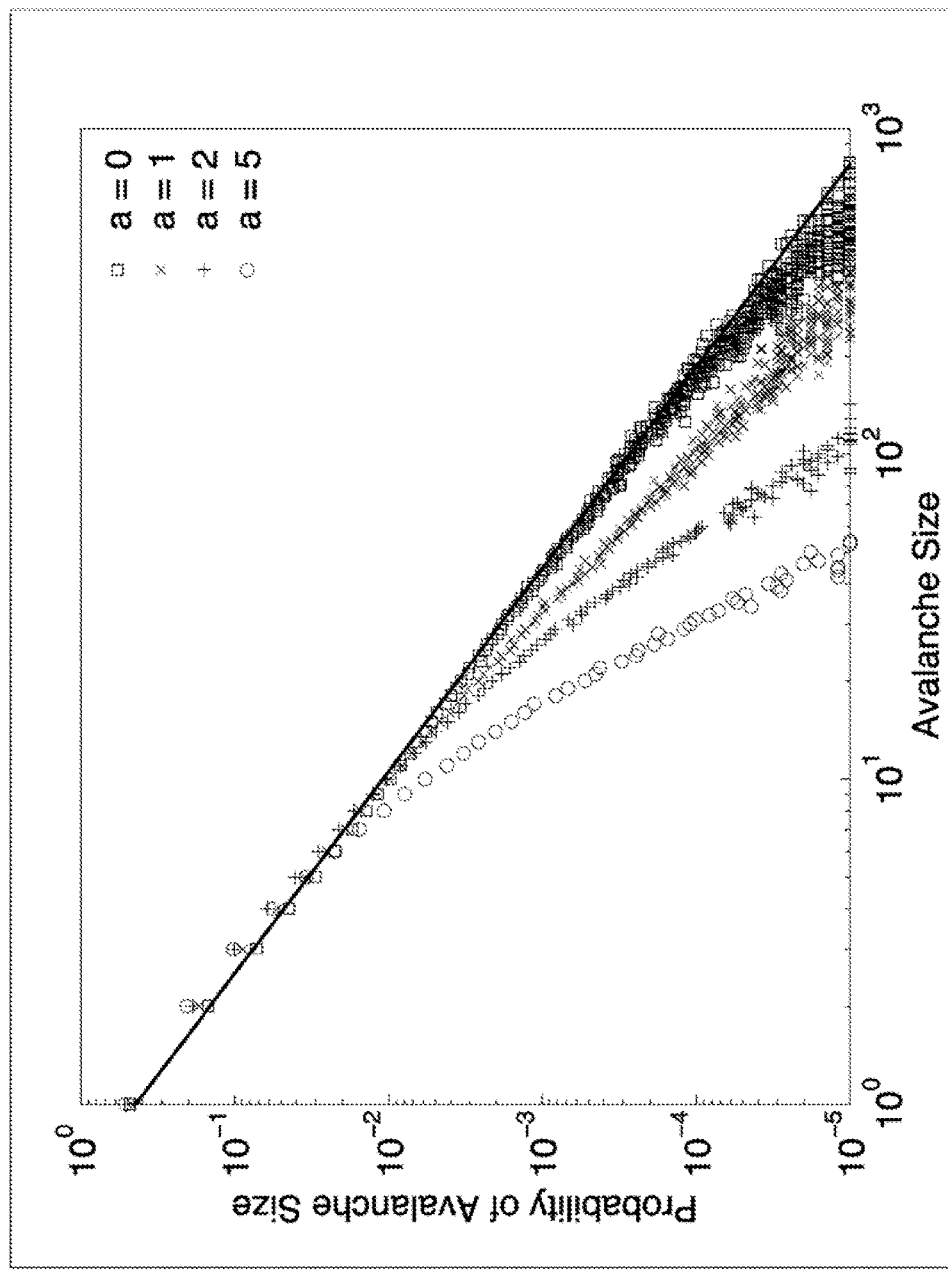
FIG. 8A is an illustration of breaking self-organized critical (SOC) behavior by restoring additional transmission lines at random locations at each iteration step in a square lattice according to the principles of the present invention.
Figure 8B:
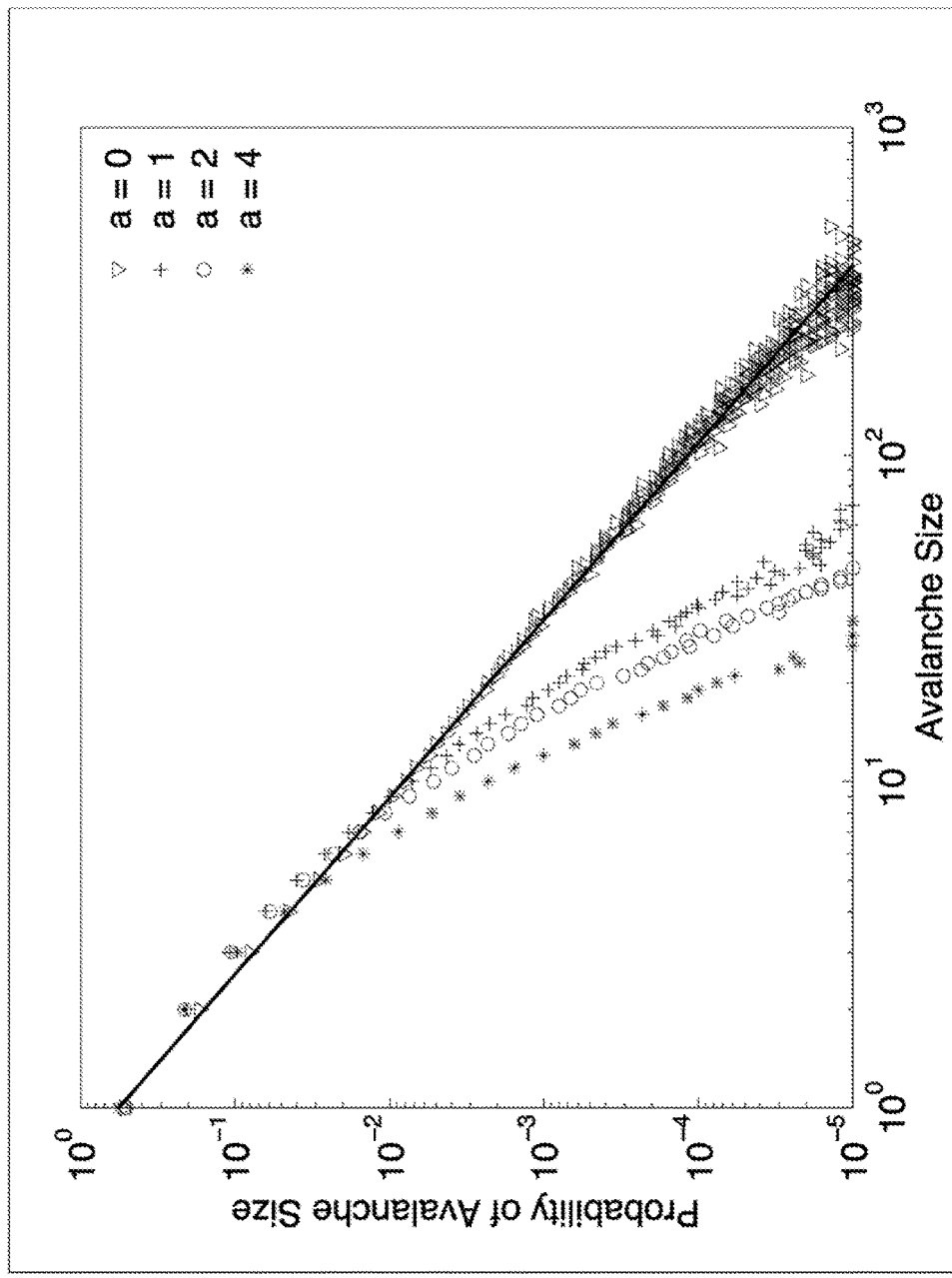
FIG. 8B is an illustration of breaking SOC behavior by restoring additional transmission lines at random locations at each iteration step in a triangular lattice according to the principles of the present invention.

The two embodiments of the system according to the principles of the present invention were tested to see if they suppress a power-law distribution of avalanche sizes in the model. In the first embodiment, additional repairs 304 were carried out after each avalanche. Apart from resetting the thresholds to $T_{ij}^0$ (the original capacity threshold value) for all lines in the avalanche, a additional lines were chosen at random and their thresholds were reset to $T_{ij}^0$ independent of their value. As a result, on the square lattice, the distribution of avalanche sizes moved away from the power law, and the effect increased with increasing a, as illustrated in FIG. 8A. Large avalanches became less likely (e.g., for a size of 100 lines, the probability dropped by more than 20× for a=2 and L=50). The reduction of large avalanches occurred already from the beginning of a simulation run and not just after the SOC settling period. FIGS. 8A and 8B show that restoring a additional lines at random locations at each iteration step (after each avalanche) breaks the SOC behavior in the square lattice (FIG. 8A) and the triangular lattice (FIG. 8B).

Whether the repair strategy according to the principles of the present invention would actually result in a total lower cost was then evaluated. To estimate the cost, a lower bound that is linear in the total number of restored lines (i.e., x+a per avalanche, if x is the size of the avalanche) is assumed. However, the total cost is likely to increase faster than linear due to the extra cost of large blackouts. Here, the aim is not to have the exact relationship, but rather to illustrate the impact of the non-linearity. Therefore, the same non-linear relationship between cost and size, $C_{nonlinear}=x^\alpha$, is added as elsewhere (see Literature Reference No. 2). In addition, differences in avalanche frequency, v, need to be taken into account. Thus, the total cost, C, per unit time is:

$$C=(x^\alpha+a)v. \qquad (5)$$

Figure 9A:
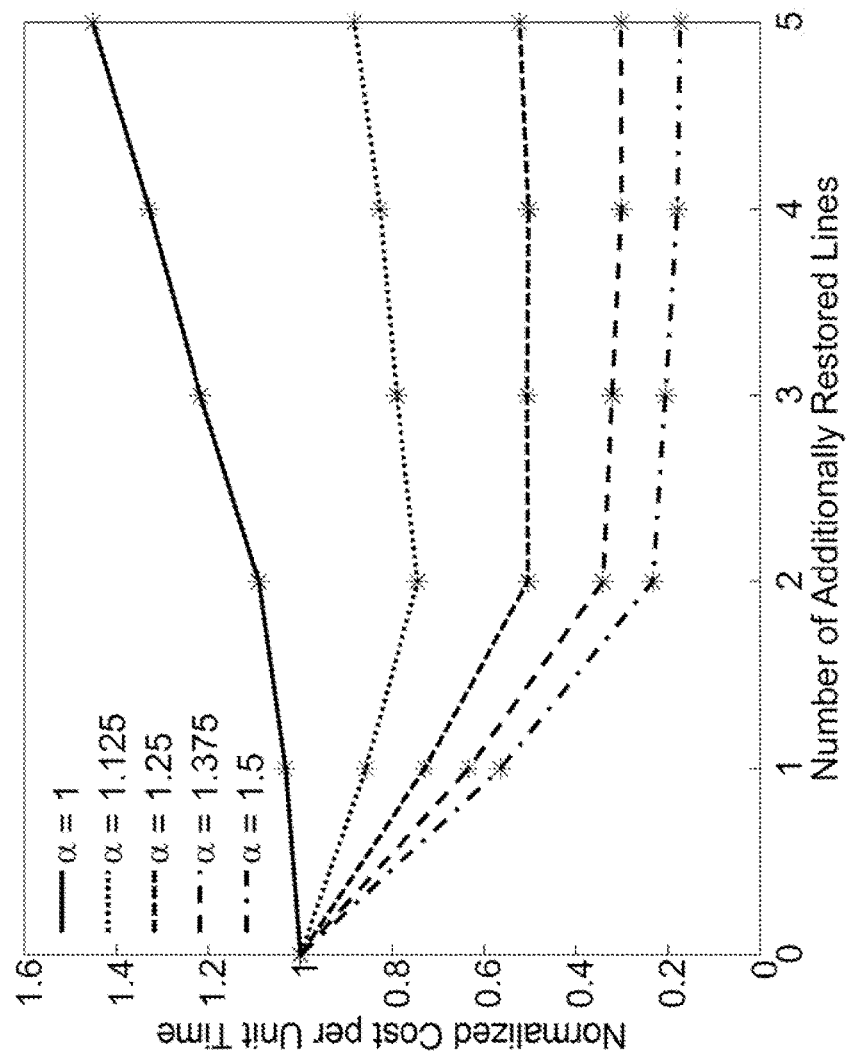
FIG. 9A is an illustration of the normalized cost per unit time as a function of the number of additionally restored lines for a square lattice according to the principles of the present invention.
Figure 9B:
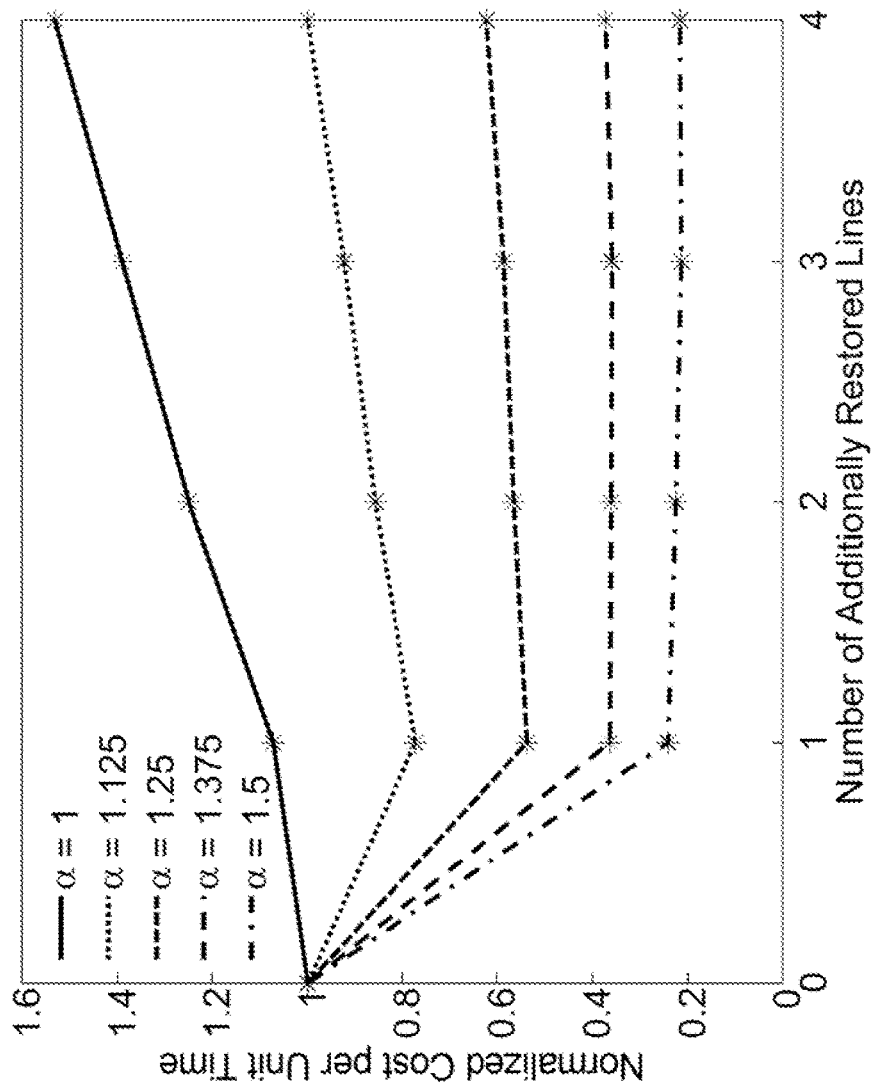
FIG. 9B is an illustration of the normalized cost per unit time as a function of the number of additionally restored lines for a triangular lattice according to the principles of the present invention.

As a result, if the non-linear increase was sufficiently large, a cost benefit of the repair strategy was observed, as depicted in FIGS. 9A and 9B. With a linear increase ($\alpha=1$), the reduction in failed lines per avalanche (49% for the square lattice for a=1 compared to a=0) was offset by the higher frequency of avalanches (1.7 times for a=1 compared to a=0). FIGS. 9A and 9B show the normalized cost per unit time as function of number of additionally restored lines, a (normalized such that the cost is 1 for a=0). The cost depends non-linearly on the avalanche size, x, while a controls the non-linearity, $x^\alpha$. The results are shown for the square (FIG. 9A) and triangular lattices (FIG. 9B) with L=50. To find the optimal a value, a processor could compute multiple simulations with different a values and compute the average cost C for each.

In the non-linear case, a trade-off between the cost of additional upgrades and the benefit of such upgrades was observed, and the optimal a depends on the form of the non-linearity. Noel et al. observed a similar behavior for their control strategy in Literature Reference No. 2. The cost reduction was as much as 83% for the square lattice, a=5 and $\alpha=1.5$.

Figure 10A:
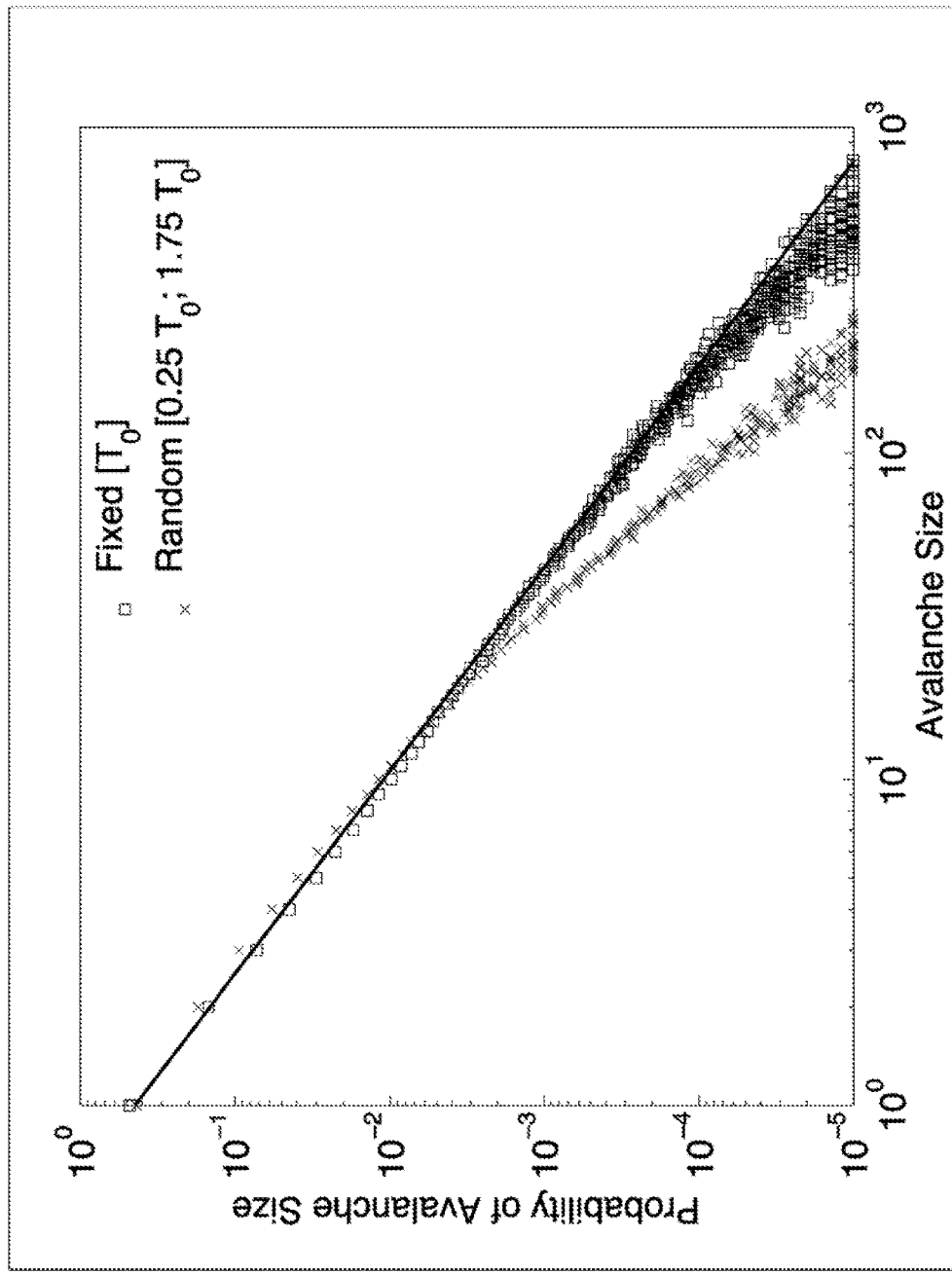
FIG. 10A is an illustration of power law breaks when resetting each line after each avalanche to a random threshold for a square lattice according to the principles of the present invention.
Figure 10B:
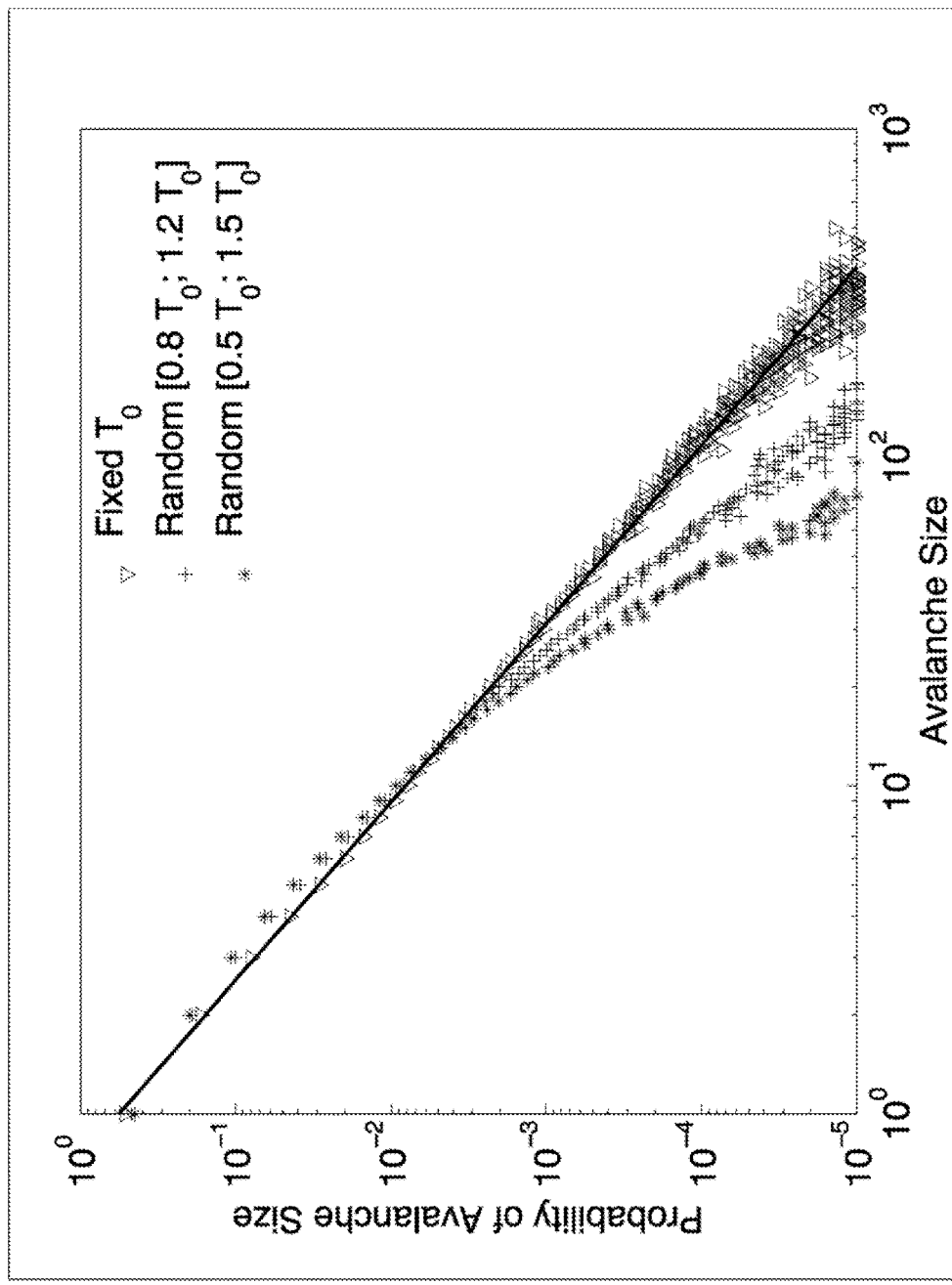
FIG. 10B is an illustration of power law breaks when resetting each line after each avalanche to a random threshold for a triangular lattice according to the principles of the present invention.

In the second embodiment of the present invention, each failed line was upgraded to a random threshold instead of to the value $T_{ij}^0$. The random threshold was drawn uniformly from the interval $[T_{ij}^0-\mu/2; T_{ij}^0+\mu/2]$, where $\mu$ is the width of the interval. As a result, this strategy also suppressed the power-law distribution, as illustrated in FIGS. 10A and 10B. In the square lattice (FIG. 10A), the decay in probability for large avalanche sizes increased with increasing noise range $\mu$ and reached a plateau for about $\mu=1.5\ T_{ij}^0$. For this value, the total number of broken lines decreased by 54% per avalanche, while the frequency of avalanches increased 2.1 times. When computing the same cost, C, as above, the cost per unit time dropped by 75% (here, a=0 and $\alpha=1.5$). FIGS. 10A and 10B show that the power law breaks when resetting each line after each avalanche to a random threshold (uniformly in an interval around $T_{ij}^0$). The results are shown for the square (FIG. 10A) and triangular (FIG. 10B) lattices with L=50.

The random update causes some lines to have a low threshold and, thus, fail prematurely. Apparently, this failure counter-intuitively has a positive effect of reducing large-scale avalanches. It likely prevents the build-up of a large cluster of lines that are close to critical threshold. In addition, lines that randomly get a high threshold can act as buffers to prevent a large-scale cascade.

What is claimed is:

1. A system for reducing a probability of large-scale failures in a transmission network, the system comprising:
    one or more processors and a non-transitory computer-readable medium having executable instructions encoded thereon such that when executed, the one or more processors perform operations of:
        receiving input data regarding tripped or damaged transmission lines in a transmission network following a cascading failure, wherein a circuit breaker having a tripping threshold is connected with each transmission line;
        identifying a subset of transmission lines connected with circuit breakers to be modified;
        randomly selecting at least one unbroken transmission line, wherein the subset of transmission lines comprises all tripped or damaged transmission lines plus the at least one unbroken transmission line;
        specifying a capacity threshold value for each transmission line in the subset of transmission lines to alter long-term dynamics of the transmission network;
        following the cascading failure, suppressing power-law distributed cascading failures by causing the circuit breaker to be electronically reset or causing the tripping threshold of the circuit breaker to be altered, wherein a distribution of any future cascading failure is sub-critical, such that the greater a size of any future cascading failure, the less it is to occur; and
        performing a cascading failure simulation of the transmission network.

2. The system as set forth in claim 1, wherein the subset of transmission lines is updated to original capacity threshold values of the subset of transmission lines.

3. The system as set forth in claim 1, wherein the subset of transmission lines is updated with a capacity threshold value that is higher than original capacity threshold values of the subset of transmission lines.

4. The system as set forth in claim 1, wherein the one or more processors further performs an operation of:
    estimating a cost of the cascading failure simulation, wherein the estimated cost is utilized to determine an average number of unbroken transmission lines to update.

5. The system as set forth in claim 1, wherein the subset of transmission lines comprises all tripped or damaged lines, and the capacity threshold value is based on a random function of its original capacity threshold value.

6. The system as set forth in claim 5, wherein the random function defines the updated capacity threshold value to be randomly drawn from a uniform distribution centered at a target threshold capacity value.

7. The system as set forth in claim 6, wherein the target threshold capacity value is equivalent to an original threshold capacity value.

8. The system as set forth in claim 6, wherein the target threshold capacity value is increased proportional to an average increase in demand over a time period.

9. A computer-implemented method for reducing a probability of large-scale failures in a transmission network, comprising:
an act of causing one or more processors to execute instructions stored on a non-transitory memory such that upon execution, the one or more processors perform operations of:
receiving input data regarding tripped or damaged transmission lines in a transmission network following a cascading failure, wherein a circuit breaker having a tripping threshold is connected with each transmission line;
identifying a subset of transmission lines connected with circuit breakers to be modified;
randomly selecting at least one unbroken transmission line, wherein the subset of transmission lines comprises all tripped or damaged transmission lines plus the at least one unbroken transmission line;
specifying a capacity threshold value for each transmission line in the subset of transmission lines to alter long-term dynamics of the transmission network;
following the cascading failure, suppressing power-law distributed cascading failures by causing the circuit breaker to be electronically reset or causing the tripping threshold of the circuit breaker to be altered, wherein a distribution of any future cascading failure is sub-critical, such that the greater a size of any future cascading failure, the less it is to occur; and
performing a cascading failure simulation of the transmission network.

10. The method as set forth in claim 9, wherein the subset of transmission lines is updated to original capacity threshold values of the subset of transmission lines.

11. The method as set forth in claim 9, wherein the subset of transmission lines is updated with a capacity threshold value that is higher than original capacity threshold values of the subset of transmission lines.

12. The method as set forth in claim 9, wherein the one or more processors further perform an operation of:
estimating a cost of the cascading failure simulation, wherein the estimated cost is utilized to determine an average number of unbroken transmission lines to update.

13. A computer program product for reducing a probability of large-scale failures in a transmission network, the computer program product comprising:
computer-readable instructions stored on a non-transitory computer-readable medium that are executable by a computer having one or more processors for causing the processor to perform operations of:
receiving input data regarding tripped or damaged transmission lines in a transmission network following a cascading failure, wherein a circuit breaker having a tripping threshold is connected with each transmission line;
identifying a subset of transmission lines connected with circuit breakers to be modified;
randomly selecting at least one unbroken transmission line, wherein the subset of transmission lines comprises all tripped or damaged transmission lines plus the at least one unbroken transmission line;
specifying a capacity threshold value for each transmission line in the subset of transmission lines to alter long-term dynamics of the transmission network;
following the cascading failure, suppressing power-law distributed cascading failures by causing the circuit breaker to be electronically reset or causing the tripping threshold of the circuit breaker to be altered, wherein a distribution of any future cascading failure is sub-critical, such that the greater a size of any future cascading failure, the less it is to occur; and
performing a cascading failure simulation of the transmission network.

14. The computer program product as set forth in claim 13, wherein the subset of transmission lines is updated to original capacity threshold values of the subset of transmission lines.

15. The computer program product as set forth in claim 13, wherein the subset of transmission lines is updated with a capacity threshold value that is higher than original capacity threshold values of the subset of transmission lines.

16. The computer program product as set forth in claim 13, further comprising instructions for causing the one or more processors to perform an operation of:
estimating a cost of the cascading failure simulation, wherein the estimated cost is utilized to determine an average number of unbroken transmission lines to update.

* * * * *